(12) United States Patent
Hu et al.

(10) Patent No.: US 11,981,827 B2
(45) Date of Patent: May 14, 2024

(54) WATERBORNE POLYURETHANE DISPERSION AND METHOD FOR PREPARING THE SAME

(71) Applicant: Dow Global Technologies LLC, Midland, MI (US)

(72) Inventors: Xiaolian Hu, Shanghai (CN); Chao Zhang, Shanghai (CN); Xiangyang Tai, Shanghai (CN); Yanli Feng, Shanghai (CN); Biao Ma, Shanghai (CN); Ling Ling, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 500 days.

(21) Appl. No.: 17/435,593

(22) PCT Filed: Aug. 14, 2019

(86) PCT No.: PCT/CN2019/100552
§ 371 (c)(1),
(2) Date: Sep. 1, 2021

(87) PCT Pub. No.: WO2020/177276
PCT Pub. Date: Sep. 10, 2020

(65) Prior Publication Data
US 2022/0154038 A1    May 19, 2022

(30) Foreign Application Priority Data

Mar. 5, 2019    (WO) ................ PCT/CN2019/076936

(51) Int. Cl.
*C09D 175/08*    (2006.01)
*B32B 5/02*      (2006.01)
(Continued)

(52) U.S. Cl.
CPC .............. *C09D 175/08* (2013.01); *B32B 5/02* (2013.01); *B32B 5/022* (2013.01); *B32B 5/024* (2013.01);
(Continued)

(58) Field of Classification Search
CPC ...... C09D 175/08; C09D 175/12; B32B 5/02; B32B 5/022; B32B 5/024; B32B 5/026;
(Continued)

(56) References Cited

U.S. PATENT DOCUMENTS

2005/0222368 A1*  10/2005  Reiners .............. C08G 18/4018
                                                528/73

FOREIGN PATENT DOCUMENTS

CN    101307181 B    6/2010
CN    102167795      8/2011
(Continued)

OTHER PUBLICATIONS

PCT/CN2019/100552, International Search Report and Written Opinion with a mailing date of Dec. 18, 2019.
(Continued)

*Primary Examiner* — Alicia J Weydemeyer
*Assistant Examiner* — Laura B Figg
(74) *Attorney, Agent, or Firm* — Warner Norcross + Judd LLP

(57) ABSTRACT

A waterborne polyurethane dispersion is provided. The waterborne polyurethane dispersion is prepared by using a tri-functionality polyether polyol as part of the polyols for forming the prepolymer and a hydrophilic amino siloxane co-chain extender, and can exhibit superior performance properties such as enhanced color fastness, improved low temperature stability, good anti-stickiness, bally flex resistance, anti-abrasion and mechanical properties. A laminated synthetic leather article prepared with said waterborne poly-
(Continued)

urethane dispersion as well the method for preparing the synthetic leather article are also provided.

13 Claims, 1 Drawing Sheet

(51) Int. Cl.
| | |
|---|---|
| *B32B 5/18* | (2006.01) |
| *B32B 5/24* | (2006.01) |
| *B32B 27/08* | (2006.01) |
| *B32B 27/12* | (2006.01) |
| *B32B 27/40* | (2006.01) |
| *C08G 18/08* | (2006.01) |
| *C08G 18/12* | (2006.01) |
| *C08G 18/22* | (2006.01) |
| *C08G 18/24* | (2006.01) |
| *C08G 18/28* | (2006.01) |
| *C08G 18/40* | (2006.01) |
| *C08G 18/42* | (2006.01) |
| *C08G 18/48* | (2006.01) |
| *C08G 18/75* | (2006.01) |
| *C08J 5/18* | (2006.01) |
| *C09D 175/12* | (2006.01) |
| *D06N 3/00* | (2006.01) |
| *D06N 3/14* | (2006.01) |
| *D06N 3/18* | (2006.01) |
| *B32B 27/20* | (2006.01) |

(52) U.S. Cl.
CPC .............. *B32B 5/026* (2013.01); *B32B 5/18* (2013.01); *B32B 5/245* (2013.01); *B32B 27/08* (2013.01); *B32B 27/12* (2013.01); *B32B 27/40* (2013.01); *C08G 18/0866* (2013.01); *C08G 18/12* (2013.01); *C08G 18/227* (2013.01); *C08G 18/24* (2013.01); *C08G 18/283* (2013.01); *C08G 18/4018* (2013.01); *C08G 18/4288* (2013.01); *C08G 18/4804* (2013.01); *C08G 18/4812* (2013.01); *C08G 18/4825* (2013.01); *C08G 18/4829* (2013.01); *C08G 18/755* (2013.01); *C08J 5/18* (2013.01); *C09D 175/12* (2013.01); *D06N 3/005* (2013.01); *D06N 3/0095* (2013.01); *D06N 3/14* (2013.01); *D06N 3/145* (2013.01); *D06N 3/183* (2013.01); *B32B 27/20* (2013.01); *B32B 2262/0223* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/065* (2013.01); *B32B 2262/10* (2013.01); *B32B 2262/101* (2013.01); *B32B 2266/0278* (2013.01); *B32B 2307/732* (2013.01); *B32B 2437/00* (2013.01); *B32B 2437/02* (2013.01); *B32B 2601/00* (2013.01); *C08J 2375/12* (2013.01); *D06N 2209/10* (2013.01); *D06N 2211/10* (2013.01); *D06N 2211/106* (2013.01); *D06N 2211/14* (2013.01); *D06N 2211/28* (2013.01); *Y10T 428/24438* (2015.01)

(58) Field of Classification Search
CPC ........... B32B 5/18; B32B 5/245; B32B 27/08; B32B 27/12; B32B 27/40; B32B 27/20; B32B 2262/0223; B32B 2262/0238; B32B 2262/0246; B32B 2262/0253; B32B 2262/0261; B32B 2262/0276; B32B 2262/065; B32B 2262/10; B32B 2262/101; B32B 2266/0278; B32B 2307/732; B32B 2437/00; B32B 2437/02; B32B 2601/00; C08G 18/0866; C08G 18/12; C08G 18/227; C08G 18/24; C08G 18/283; C08G 18/4018; C08G 18/4288; C08G 18/4804; C08G 18/4812; C08G 18/4825; C08G 18/4829; C08G 18/755; C08J 5/18; C08J 2375/12; D06N 3/005; D06N 3/0095; D06N 3/14; D06N 3/145; D06N 3/183; D06N 2209/10; D06N 2211/10; D06N 2211/106; D06N 2211/14; D06N 2211/28; Y10T 428/24438

See application file for complete search history.

(56) References Cited

FOREIGN PATENT DOCUMENTS

| | | |
|---|---|---|
| CN | 103497308 | 1/2014 |
| CN | 103739811 | 4/2014 |
| CN | 104962192 | 10/2015 |
| CN | 105647372 | 6/2016 |
| CN | 106632964 | 5/2017 |
| CN | 107057032 | 8/2017 |
| CN | 107722236 | 2/2018 |
| EP | 0078597 B1 | 8/1986 |
| JP | 2014159660 A | 9/2014 |
| WO | 2006086092 A2 | 8/2006 |

OTHER PUBLICATIONS

PCT/CN2019/100552, International Preliminary Report on Patentability with a mailing date of Sep. 16, 2021.
Search Report from corresponding European 19918322.9 application, dated Oct. 7, 2022.

\* cited by examiner

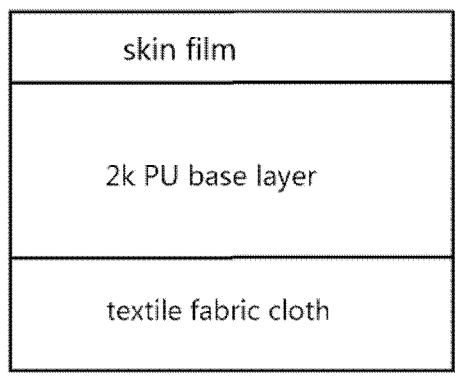

WATERBORNE POLYURETHANE DISPERSION AND METHOD FOR PREPARING THE SAME

FIELD OF THE INVENTION

The present disclosure relates to a waterborne polyurethane dispersion and a method for preparing the same, a laminated synthetic leather article comprising a skin film derived from the waterborne polyurethane dispersion and a method for preparing the same. The laminated synthetic leather article prepared with said waterborne polyurethane dispersion exhibits a combination of superior performance properties such as enhanced color fastness, improved low temperature stability, good anti-stickiness, bally flex resistance, anti-abrasion and mechanical properties.

INTRODUCTION

Synthetic leather gets popular applications in people's daily life, from clothes, footwear, bag and luggage, home upholstery to seats in automobile. It provides similar performance and hand feeling to natural leather with much better cost advantage. Synthetic leather is fabricated by coating polymer(s) on a fabric substrate or impregnating polymer(s) into a fabric substrate, and the most commonly used polymer is polyurethane. Traditional processes are performed with the solution of polyurethane resin(s) in volatile organic solvents such as dimethylformamide (DMF), methylethyl ketone (MEK) and toluene. Porous structure of PU is created by precipitating PU polymer chain in a controlled manner through leading the coated or impregnated fabric substrate into water bath. Such a porous structure is very critical and essential to endow the synthetic leather with a similar hand feeling as that of natural leather. However, the volatile organic solvents are very hazardous to plant operators, consumers and environment. Therefore, synthetic leather industry is pushed to solvent free fabrication process, to minimize the use of volatile organic solvents in the manufacturing of PU synthetic leather. Waterborne polyurethane dispersions (PUD's) are continuously replacing the conventional solvent-based polyurethane applied in synthetic leather industry due to ever stricter environment regulations. Currently, most of the waterborne PUD's are based on polyester polyol and aliphatic isocyanates due to their good mechanical properties (such as tensile strength and modulus). However, polyester polyol based PUD's have many problems, e.g. poor hydrolysis resistance, high cost and low dispersity in water due to high viscosity of polyester prepolymer). Polyether polyol based PUD's don't have such problems, but the mechanical properties and anti-stickiness performance are poor due to the intrinsic softness of polyether polyol. A newly developed technology for producing a synthetic leather is to laminate a externally emulsified skin layer derived from a polyurethane dispersion with a non-solvent 2K (i.e., two-component) PU foam layer, but the skin layer of the laminated synthetic leather exhibits unfavorable anti-stickiness performance which cannot meet the requirements of the synthetic leather application as any slight stickiness in the skin film would not be acceptable to the customer. Besides, traditional commercialized aliphatic PUD produced via internal emulsification still comprises small amount of solvent and has poor adhesion to the underlying 2K foam layer, thus an adhesion layer has to be disposed between the skin layer formed by the PUD and the underlying 2K foam layer. There is still a need for developing a technology by which a synthetic leather consisting of a skin layer derived from a solvent-free externally emulsified PUD and a non-solvent 2K PU foam layer can be prepared without using an intermediate adhesion layer. Besides, when being used for preparing the skin layer of the synthetic leather, the PUD or PUD formulation should meet many requirements, including specific mechanical property, anti-stickiness, bally flex resistance, anti-abrasion, color fastness, high/low temperature stability.

After persistent exploration, we have surprisingly found that one or more of the above stated requirements can be met with a PUD prepared by using at least one tri-hydroxyl polyether polyol as part of the polyols for forming the prepolymer and a hydrophilic amino siloxane co-chain extender.

SUMMARY OF THE INVENTION

The present disclosure provides a unique waterborne polyurethane dispersion and a laminated synthetic leather article prepared by using the same.

In a first aspect of the present disclosure, the present disclosure provides a waterborne polyurethane dispersion comprising polyurethane particles dispersed in water, wherein the waterborne polyurethane dispersion is derived from the reaction of:
(A) an isocyanate component comprising one or more compounds having at least two isocyanate groups;
(B) an isocyanate-reactive component comprising one or more compounds having at least two isocyanate-reactive groups, wherein the isocyanate-reactive component comprises a polyether polyols having a hydroxyl functionality of 3.0 and a weight average molecular weight of 1,500 to 12,000 g/mol;
(C) a hydrophilic amino siloxane compound represented Formula I:

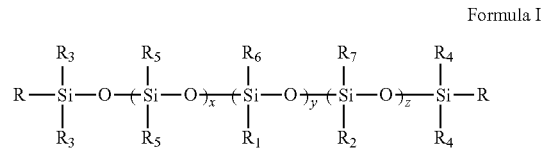

Formula I wherein each R independently represents methyl, ethyl, n-propyl, i-propyl, n-butyl, butyl, sec-butyl, t-butyl, n-pentyl, i-pentyl, tert-pentyl, neo-pentyl, cyclohexyl, phenyl, vinyl, allyl or —(OCH$_2$CH$_2$)$_a$—O—CH$_2$—CH=CH$_2$;
R$_1$ is —(CH$_2$)$_m$NH$_2$ or —(CH$_2$)$_s$—NH—(CH$_2$)$_t$NH$_2$;
R$_2$ is —CH$_2$CH$_2$CH$_2$O(CH$_2$CH$_2$O)$_n$H, and
each of R$_3$, R$_4$, R$_5$, R$_6$ and R$_7$ is independently selected from the group consisting of methyl, ethyl, n-propyl, i-propyl, n-butyl, i-butyl, sec-butyl, t-butyl, n-pentyl, i-pentyl, tert-pentyl, neo-pentyl, cyclohexyl and phenyl;
wherein a is an integer of 1 to 10; x is an integer of 20-500; y is an integer of 1-10; z is an integer of 1-10; m is an integer of 1-5; s is an integer of 1, 2, 3, 4 or 5; t is an integer of 1, 2, 3, 4 or 5; and n is an integer of 5-20;
(D) a catalyst;
(E) a surfactant;
(F) a chain extender; and
(G) water.

According to a preferable embodiment of the present disclosure, the waterborne polyurethane dispersion is an externally emulsified polyurethane that does not comprise cationic or anionic hydrophilic pendant group covalently attached to the backbone chain of the polyurethane or a group which can be converted into the cationic or anionic hydrophilic pendant groups which groups are covalently attached to the backbone chain of the polyurethane.

According to a preferable embodiment of the present disclosure, the isocyanate-reactive component (B) comprises the polyether polyols having a hydroxyl functionality of 3.0 and a weight average molecular weight of 1,500 to 12,000 g/mol as an essential component, and may optionally comprises additional compounds having at least two isocyanate-reactive groups other than the above stated polyether polyols.

In a second aspect of the present disclosure, the present disclosure provides a method for producing the waterborne polyurethane dispersion of the first aspect, comprising (i) reacting the isocyanate component (A) with the isocyanate-reactive component (B) in the presence of the catalyst (D) to form a prepolymer, wherein the prepolymer comprises free isocyanate group and residual moiety derived from the polyether polyols having a hydroxyl functionality of 3.0 and a weight average molecular weight of 1,500 to 12,000 g/mol; and (ii) reacting the prepolymer with the hydrophilic amino siloxane compound (C) and the chain extender (F) in the presence of the surfactant (E) and water (G) to form the waterborne polyurethane dispersion.

In a third aspect of the present disclosure, the present disclosure provides a synthetic leather article, comprising, from top to bottom:
 a polyurethane skin film derived from the waterborne polyurethane dispersion of the first aspect;
 a base layer derived from a 2K PU composite composition; and
 an optional backing substrate.

In a fourth aspect of the present disclosure, the present disclosure provides a method for preparing the synthetic leather article of the third aspect, comprising:
 a) providing the waterborne polyurethane dispersion of the first aspect;
 b) forming the polyurethane skin film with the waterborne polyurethane dispersion;
 c) applying the 2K PU composite composition onto one side of the polyurethane skin film to form the base layer; and
 d) optionally applying the backing substrate onto one side of the base layer opposite the polyurethane skin film.

It is to be understood that both the foregoing general description and the following detailed description are exemplary and explanatory only and are not restrictive of the invention, as claimed.

BRIEF DESCRIPTION OF THE DRAWINGS

FIG. 1 is a schematic illustration of a cross-section of one embodiment of a synthetic leather article described herein.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, the term "composition", "formulation" or "mixture" refers to a physical blend of different components, which is obtained by mixing simply different components by a physical means.

As disclosed herein, "and/or" means "and, or as an alternative". All ranges include endpoints unless otherwise indicated.

The Isocyanate Component

In various embodiments, the isocyanate component (A) has an average functionality of at least about 2.0, preferably from about 2 to 10, more preferably from about 2 to about 8, and most preferably from about 2 to about 6. In some embodiments, the isocyanate component includes a polyisocyanate compound comprising at least two isocyanate groups. Suitable polyisocyanate compounds include aromatic, aliphatic, cycloaliphatic and araliphatic polyisocyanates having two or more isocyanate groups. In a preferable embodiment, the polyisocyanate component comprises polyisocyanate compounds selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, and combinations thereof. In another preferable embodiment, suitable polyisocyanate compounds include m-phenylene diisocyanate, 2,4-toluene diisocyanate and/or 2,6-toluene diisocyanate (TDI), the various isomers of diphenylmethanediisocyanate (MDI), carbodiimide modified MDI products, hexamethylene-1,6-diisocyanate, tetramethylene-1,4-diisocyanate, cyclohexane-1,4-diisocyanate, hexahydrotoluene diisocyanate, hydrogenated MDI, naphthylene-1,5-diisocyanate, isophorone diisocyanate (IPDI), or mixtures thereof.

Alternatively or additionally, the polyisocyanate component may also comprise a isocyanate prepolymer having an isocyanate functionality in the range of 2 to 10, preferably from 2 to 8, more preferably from 2 to 6. The isocyanate prepolymer can be obtained by reacting the above stated monomeric isocyanate components with one or more isocyanate-reactive compounds selected from the group consisting of ethylene glycol, 1,2-propanediol, 1,3-propanediol, 1,3-butanediol, 1,4-butenediol, 1,4-butynediol, 1,5-pentanediol, neopentyl-glycol, bis(hydroxy-methyl) cyclohexanes such as 1,4-bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol, polybutylene glycols and tri-hydroxy polyether polyol, such as the tri-hydroxy polyether polyol particularly used for the isocyanate-reactive component (B). Suitable prepolymers for use as the polyisocyanate component are prepolymers having NCO group contents of from 2 to 40 weight percent, more preferably from 4 to 30 weight percent. These prepolymers are preferably prepared by reaction of the di- and/or poly-isocyanates with materials including lower molecular weight diols and triols. Individual examples are aromatic polyisocyanates containing urethane groups, preferably having NCO contents of from 5 to 40 weight percent, more preferably 20 to 35 weight percent, obtained by reaction of diisocyanates and/or polyisocyanates with, for example, lower molecular weight diols, triols, oxyalkylene glycols, dioxyalkylene glycols, or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene-polyoxyethylene glycols can be used. Polyester polyols can also be used, as well as alkane diols such as butane diol. Other diols also useful include bishydroxyethyl- or bishydroxypropyl-bisphenol A, cyclohexane dimethanol, and bishydroxyethyl hydroquinone.

Also advantageously used for the isocyanate component are the so-called modified multifunctional isocyanates, that is, products which are obtained through chemical reactions of the above isocyanates compounds. Exemplary are polyisocyanates containing esters, ureas, biurets, allophanates and preferably carbodiimides and/or uretoneimines. Liquid polyisocyanates containing carbodiimide groups, uretoneimines groups and/or isocyanurate rings, having isocyanate groups (NCO) contents of from 12 to 40 weight percent, more preferably from 20 to 35 weight percent, can also be used. These include, for example, polyisocyanates based on 4,4'-2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI; and mixtures of toluene diisocyanates and PMDI and/or diphenylmethane diisocyanates.

Generally, the amount of the isocyanate component may vary based on the actual requirement of the synthetic leather article. For example, as one illustrative embodiment, the content of the isocyanate component can be from about 5 wt % to about 50 wt %, preferably from about 10 wt % to about 40 wt %, preferably from about 15 wt % to about 30 wt %, based on the total weight of all the components for preparing the prepolymer, i.e., based on the total weight of the isocyanate component (A), the isocyanate-reactive component (B) and the catalyst (D).

The Isocyanate-Reactive Component

In the present application, the terms "tri-hydroxyl polyether polyol", "tri-functional polyether polyol" and "polyether polyol having a hydroxyl functionality of 3.0" are used interchangeably and represent a polyether polyol comprising approximately three hydroxyl groups in each molecule. Similarly, the "di-hydroxyl polyether polyol" and "di-functional polyether polyol" can be used interchangeably and interpreted in the same way.

In various embodiments of the present disclosure, the isocyanate-reactive component (B) comprises a tri-hydroxyl polyether polyol and optionally one or more polyols selected from the group consisting of aliphatic polyhydric alcohols comprising at least two hydroxy groups, cycloaliphatic or aromatic polyhydric alcohols comprising at least two hydroxy groups, araliphatic polyhydric alcohols comprising at least two hydroxy groups, polyether polyol other than the tri-hydroxyl polyether polyol (e.g. a polyether polyol having a hydroxyl functionality not equaling to 3.0, such as from larger than 1.0 to less than 3.0, from larger than 3.0 to 4.0, up to 5.0, up to 6.0, up to 7.0, or up to 8.0), polyester polyol, vegetable oil having at least two hydroxyl groups and mixture thereof. In various embodiments of the present disclosure, the tri-hydroxyl polyether polyol has a functionality of 3.0 and a weight average molecular weight (Mw) of 1,500 to 12,000 g/mol, preferably from 2,000 to 8,000 g/mol, more preferably 2,000 to 6,000 g/mol. Preferably, the polyol other than the above stated tri-hydroxyl polyether polyol is selected from the group consisting of C2-C16 aliphatic polyhydric alcohols comprising at least two hydroxy groups, C6-C15 cycloaliphatic or aromatic polyhydric alcohols comprising at least two hydroxy groups, C7-C15 araliphatic polyhydric alcohols comprising at least two hydroxy groups, polyester polyols having a molecular weight from 100 to 5,000, polyether polyols having a hydroxyl functionality not equaling to 3.0 and having a molecular weight from 1,500 to 12,000, and combinations thereof. According to a preferable embodiment, the polyol other than the above stated tri-hydroxyl polyether polyol is a di-hydroxyl polyether polyol, i.e. the isocyanate-reactive component (B) can be a combination of a tri-hydroxyl polyether polyol and a di-hydroxyl polyether polyol; more preferably, the di-hydroxyl polyether polyol may have a molecular weight (Mw) of 1,500 to 12,000 g/mol, preferably 2,000 to 8,000 g/mol, more preferably 2,000 to 6,000 g/mol.

In an alternatively embodiment, the isocyanate-reactive component may further comprises one or more other polyols that are not polyether polyol, such as polyester polyols, or vegetable oils having at least two hydroxyl groups.

In an alternative embodiment, the isocyanate-reactive component is a polyether polyols having a functionality (average number of isocyanate-reactive groups, particularly, hydroxyl group, in a polyol molecule) of 1.0 to 3.0 and a weight average molecular weight (Mw) of 1,500 to 12,000 g/mol, preferably from 2,000 to 8,000 g/mol, more preferably from 2,000 to 6,000 g/mol.

The polyether polyols are generally prepared by polymerization of one or more alkylene oxides selected from propylene oxide (PO), ethylene oxide (EO), butylene oxide, tetrahydrofuran and mixtures thereof, with proper starter molecules in the presence of catalyst. The di-functional polyether polyols is usually prepared with di-functional raw materials such as propylene oxide, ethylene oxide, butylene oxide, tetrahydrofuran and mixtures thereof, while the preparation of the tri-functional polyether polyols usually comprises at least one tri-hydroxyl raw material such as 1,2,3-propanetriol. Typical starter molecules include compounds having at least 2, preferably from 4 to 8 hydroxyl groups or having two or more primary amine groups in the molecule. Suitable starter molecules are for example selected from the group comprising aniline, EDA, TDA, MDA and PMDA, more preferably from the group comprising TDA and PMDA, an most preferably TDA. When TDA is used, all isomers can be used alone or in any desired mixtures. For example, 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all the above isomers can be used. By way of starter molecules having at least 2 and preferably from 2 to 8 hydroxyl groups in the molecule it is preferable to use trimethylolpropane, glycerol, pentaerythritol, castor oil, sugar compounds such as, for example, glucose, sorbitol, mannitol and sucrose, polyhydric phenols, resols, such as oligomeric condensation products of phenol and formaldehyde and Mannich condensates of phenols, formaldehyde and dialkanolamines, and also melamine. Catalyst for the preparation of polyether polyols may include alkaline catalysts, such as potassium hydroxide, for anionic polymerization or Lewis acid catalysts, such as boron trifluoride, for cationic polymerization. Suitable polymerization catalysts may include potassium hydroxide, cesium hydroxide, boron trifluoride, or a double cyanide complex (DMC) catalyst such as zinc hexacyanocobaltate or quaternary phosphazenium compound. In a preferable embodiment of the present disclosure, the polyether polyol other than the tri-hydroxyl polyether polyol includes (methoxy) polyethylene glycol (MPEG), polyethylene glycol (PEG), poly(propylene glycol) and copolymer of ethylene epoxide and propylene epoxide with primary hydroxyl ended group and secondary hydroxyl ended group. According to a preferable embodiment of the present disclosure, the tri-hydroxy polyether polyol includes copolymer of 1,2,3-propanetriol and ethylene epoxide, copolymer of 1,2,3- propanetriol and propylene epoxide, copolymer of 1,2,3-propanetriol, ethylene epoxide and propylene epoxide, with primary hydroxyl ended group or secondary hydroxyl ended group.

In general, the content of the isocyanate-reactive component used herein may range from about 35 wt % to about 95 wt %, preferably from about 60 wt % to about 85 wt %, based on the total weight of all the components for preparing the prepolymer in the first stage, i.e., based on the total weight of the isocyanate component (A), the isocyanate-reactive component (B) and the catalyst (D).

According to various embodiment of the present application, the content of the tri-hydroxy polyether polyol contained in the isocyanate-reactive component (B) may range from about 10 wt % to about 30 wt %, preferably from about 10 wt % to about 25 wt %, more preferably from about 10 wt % to about 20 wt %, based on the total weight of all the components for preparing the prepolymer, i.e. based on the total weight of the isocyanate component (A), the isocyanate-reactive component (B) and the catalyst (D).

According to a preferable embodiment of the present application, the isocyanate-reactive component (B) is a combination of the tri-hydroxyl polyether polyol and an additional polyether polyol other than the tri-hydroxyl polyether polyol (such as a polyether polyol having a hydroxyl functionality of from larger than 1.0 to less than 3.0, e.g. from larger than 1.0 to 2.0), wherein the content of the above stated "additional" polyether polyol contained in the isocyanate-reactive component (B) may range from about 25 wt % to about 85 wt %, preferably from about 45 wt % to about 85 wt %, more preferably from about 55 wt % to about 75 wt %, based on the total weight of all the components for preparing the prepolymer, i.e. based on the total weight of the isocyanate component (A), the isocyanate-reactive component (B) and the catalyst (D).

Catalyst

Catalyst may include any substance that can promote the reaction between the isocyanate group and the isocyanate-reactive group. Without being limited to theory, the catalysts can include, for example, glycine salts; tertiary amines; tertiary phosphines, such as trialkylphosphines and dialkylbenzylphosphines; morpholine and derivatives thereof; piperazine and derivatives thereof; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediamine, tetramethylethylenediamine, pentamethyl-diethylene triamine, bis(2-dimethylaminoethyl)ether, triethylamine, tripropylamine, tributyl-amine, triamylamine, pyridine, quinoline, dimethylpiperazine, piperazine, N-ethylmorpholine, 2-methylpropanediamine, methyltriethylenediamine, 2,4,6-tridimethylamino-methyl)phenol, N,N',N''-tris(dimethyl amino-propyl)sym-hexahydro triazine, or mixtures thereof.

In general, the content of the catalyst used herein is larger than zero and is at most 1.0 wt %, preferably at most 0.5 wt %, more preferably at most 0.1 wt %, such as at most 0.05 wt %, based on the total weight of all the components for preparing the prepolymer, i.e., based on the total weight of the isocyanate component (A), the isocyanate-reactive component (B) and the catalyst (D).

Hydrophilic Amino Siloxane Compound

The hydrophilic amino siloxane compound is a compound comprising a silicon-oxygen back bone chain to which nitrogen-containing side chain and hydrophilic side chain are attached. The molecular structure of the hydrophilic amino siloxane compound may be represented by Formula I:

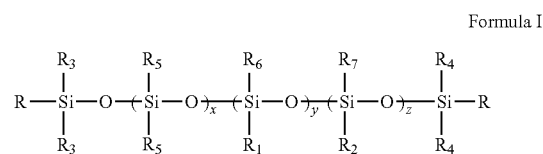

Formula I wherein each R independently represents methyl, ethyl, n-propyl, i-propyl, n-butyl, butyl, s-butyl, t-butyl, n-pentyl, i-pentyl, tert-pentyl, neo-pentyl, cyclohexyl, phenyl, vinyl, allyl or —(OCH$_2$CH$_2$)$_a$—O—CH$_2$—CH=CH$_2$;

$R_1$ is —(CH$_2$)$_m$NH$_2$ or —(CH$_2$)$_s$—NH—(CH$_2$)$_t$NH$_2$;

$R_2$ is —CH$_2$CH$_2$CH$_2$O(CH$_2$CH$_2$O)$_n$H, and each of $R_3$, $R_4$, $R_5$, $R_6$ and $R_7$ is independently selected from the group consisting of methyl, ethyl, n-propyl, i-propyl, n-butyl, i-butyl, sec-butyl, t-butyl, n-pentyl, i-pentyl, tert-pentyl, neo-pentyl, cyclohexyl and phenyl;

wherein a is an integer of 1 to 10, such as 1, 2, 3, 4, 5, 6, 7, 8, 9 or 10; x is an integer of 20-200, such as 20, 30, 40, 50, 60, 70, 80, 90, 100, 110, 120, 130, 140, 150, 160, 170, 180, 190 and 200; y is an integer of 1-10, such as 1, 2, 3, 4, 5, 6, 7, 8, 9 or 10; z is an integer of 1-10, such as 1, 2, 3, 4, 5, 6, 7, 8, 9 or 10; m is an integer of 1-5, such as 1, 2, 3, 4 or 5; s is an integer of 1, 2, 3, 4 or 5; t is an integer of 1, 2, 3, 4 or 5; and n is an integer of 5-20, such as 5, 6, 7, 8, 9, 10, 11, 12, 13, 14, 15, 16, 17, 18, 19 or 20.

Without being limited to theory, the amine group in $R_1$ and the hydroxyl group in $R_2$ may react with the remaining isocyanate group in the prepolymer to produce a polyurethane comprising the above siloxane structure in the polyurethane back bone chain, thus significantly improve the performance properties (such as anti-stickiness) of the resultant PU skin film.

According to one preferable embodiment of the present disclosure, the hydrophilic amino siloxane compound has a structure presented by Formula II:

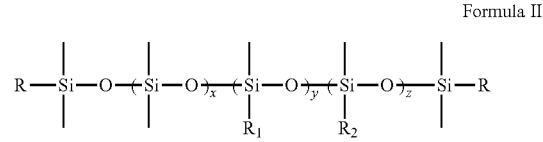

Formula II wherein R, $R_1$, $R_2$, x, y and z are as described above.

In general, the content of the hydrophilic amino siloxane compound used herein is from 2 wt % to 10 wt %, preferably from 2 wt % to 8 wt %, more preferably from 2 wt % to 5 wt %, based on the total weight of all the components for preparing the prepolymer, i.e., based on the total weight of the isocyanate component (A), the isocyanate-reactive component (B) and the catalyst (D). It can be seen that the content of the hydrophilic amino siloxane compound is calculated as an additional amount while taking the total amount of the prepolymer as 100 wt %.

It's noted that the hydrophilic amino siloxane compound should be firstly dissolved/dispersed in water via mixing to get an aqueous solution and then degassed. In this invention, the amino silicone oil was added during the dispersion stage and was not added into polymer backbone during the prepolymer synthesis stage. The reason is that some degree of polymer gel will be formed if the siloxane was added during the prepolymer synthesis stage.

Surfactant/Emulsifier

According to a preferable embodiment, the waterborne polyurethane dispersion is an externally emulsified dispersion, i.e., the waterborne polyurethane dispersion is preferably prepared exclusively by using "external surfactant/emulsifier" and substantially comprises no "internal surfactant/emulsifier".

The expression "externally emulsified polyurethane dispersion" as described herein refers to a polyurethane dispersion comprising limited amount of internally emulsifying ionic components and thus mainly relying on the emulsifying function of "external surfactant/emulsifier" [i.e. ionically or nonionically emulsifiers that are not covalently bonded to the backbone chain within the polyurethane particles dispersed in the liquid medium, especially via the urethane bond derived from the reaction between an isocyanate group and an isocyanate-reactive group (such as a hydroxyl group)] so as to stabilize the polyurethane dispersion.

According to one embodiment of the present disclose, the externally emulsified polyurethane dispersion is prepared by (i) reacting one or more monomeric or prepolymeric polyisocyanates with the isocyanate-reactive component (B) as stated above to form a prepolymer comprising an urethane prepolymer chain and at least one, preferably at least two free isocyanate groups per molecule; (ii) dispersing the prepolymer obtained in step (i) in an aqueous solvent (e.g. water) with the presence of the external emulsifier to form an emulsion and optionally further adding the chain extender and the hydrophilic amino siloxane compound into the emulsion to react with the prepolymer obtained in step (i) and form the externally emulsified polyurethane dispersion. According to one embodiment of the present disclosure, the prepolymer prepared in the step (i) does not comprise any ionic internal emulsifier or residual moieties of the ionic internal emulsifier covalently bonded to the urethane prepolymer chain. According to another embodiment of the present disclosure, the polyurethane chain in the prepolymer prepared in the step (i) does not comprise any cationic or anionic pendant group.

The PUD prepared by using an internal surfactant/emulsifier is known as an "internally emulsified PUD". According to the knowledge of the prior art, a typical process for preparing an internally emulsified PUD comprises the steps of (i) reacting an monomeric isocyanate or a prepolymer of the monomeric isocyanate with polyols and cationic or anionic precursor which has at least one isocyanate-reactive groups (i.e., an ionic internal emulsifier) to form a PUD prepolymer comprising pendant cationic or anionic hydrophilic groups attached to the PU chain; (ii) dispersing the PUD prepolymer into an aqueous solvent (e.g. water), with the cationic or anionic hydrophilic group attached to the PU chain as main emulsifier, optionally with the assistance of additional external emulsifier in this step; and optionally (iii) reacting the emulsion with additional chain extender to form the ionic internally emulsified polyurethane dispersion. It can be clearly seen that the externally emulsified PUD used in the present disclosure is completely different from the ionic internally emulsified PUD of the prior art both in the preparation process and the composition of the resultant polyurethane particles. It shall be clarified that the polyurethane particles prepared by the present application comprise residual groups of the chain extenders and the hydrophilic amino siloxane compound attached to the polyurethane main chain, but these residual groups are different from the above stated ionic internal emulsification function groups at least in the charge neutrality and hence shall be excluded from the definition of the ionic internal emulsifying function groups. Besides, in a preferable embodiment, the emulsifying of the polyurethane is conducted mainly or solely by using the external emulsifier, and the chain extender and hydrophilic amino siloxane compound are not added until an emulsion of PU has been formed. That is why the PU dispersion of the present disclosure is identified as an externally emulsified system.

In one embodiment of the present disclosure, the above stated ionic internal emulsifying component (emulsifier) is not added during the preparation of the externally emulsified PUD. In a preferable embodiment of the present disclosure, the externally emulsified polyurethane dispersion is free of anionic or cationic salt group in the backbone chain of the polyurethane prepolymer particles dispersed in the externally emulsified PUD.

The waterborne polyurethane dispersion of the present disclosure may be prepared by using any anionic surfactant, cationic surfactant, amphoteric surfactant or non-ionic surfactant. Suitable classes of surfactant include, but are not restricted to, sulfates of ethoxylated phenols such as poly(oxy-1,2-ethanediyl)α-sulfo-ω(nonylphenoxy) salt; alkali metal fatty acid salts such as alkali metal oleates and stearates; alkali metal $C_{12}$-$C_{16}$ alkyl sulfates such as alkali metal lauryl sulfates; amine $C_{12}$-$C_{16}$ alkyl sulfates such as amine lauryl sulfates, more preferably triethanolamine lauryl sulfate; alkali metal $C_{12}$-$C_{16}$ alkylbenzene sulfonates such as branched and linear sodium dodecylbenzene sulfonates; amine $C_{12}$-$C_{16}$ alkyl benzene sulfonates such as triethanolamine dodecylbenzene sulfonate; anionic and non-ionic fluorocarbon emulsifiers such as fluorinated $C_4$-$C_{16}$ alkyl esters and alkali metal $C_4$-$C_{16}$ perfluoroalkyl sulfonates; organosilicon emulsifiers such as modified polydimethylsiloxanes. Preferably, the surfactant is one that can react with a multivalent cation present in a neutral salt to form an insoluble multivalent cation water insoluble salt of an organic acid. Exemplary preferred surfactant includes disodium octadecyl sulfosuccinate, sodium dodecylbenzene sulfonate, sodium stearate and ammonium stearate.

According to an embodiment of the present disclosure, the content of the surfactant is larger than zero and no more than 10 wt %, preferably no more than 5 wt %, more preferably no more than 3.5 wt %, based on the total weight of all the components for preparing the prepolymer, i.e., based on the total weight of the isocyanate component (A), the isocyanate-reactive component (B) and the catalyst (D).

It can be seen that the content of the surfactant is calculated as an additional amount while taking the total amount of the prepolymer as 100 wt %.

Chain Extender

According to one embodiment of the present disclosure, the chain extender may be a diamine or an amine compound having another isocyanate reactive group, but is preferably selected from the group consisting of: an aminated polyether diol; piperazine; aminoethylethanolamine; $C_2$-$C_{16}$ aliphatic polyamine comprising at least two amine groups, e.g., ethylenediamine; $C_4$-$C_{15}$ cycloaliphatic or aromatic polyamine comprising at least two amine groups, such as cyclohexanediamine and p-xylenediamine; $C_7$-$C_{15}$ araliphatic polyamine comprising at least two amine groups; aminated $C_2$-$C_8$ alcohol, e.g., ethanolamine; and mixtures thereof. According to a preferable embodiment, the chain extender is a polyamine having a functionality of 2 and comprising primary amine group or secondary amine group. According to one embodiment of the present disclosure, the chain extender includes aliphatic amines with rigid backbone, and preferable examples of the chain extender include piperazine, cyclohexanediamine and p-xylenediamine. Preferably, the amine chain extender is dissolved in the water used to make the PU dispersion.

According to an embodiment of the present disclosure, the content of the chain extender is from 1.0 wt % to 15 wt %, preferably from 2 wt % to 10 wt %, more preferably from 3 wt % to 9 wt %, based on the total weight of all the components for preparing the prepolymer in the first stage, i.e., based on the total weight of the isocyanate component (A), the isocyanate-reactive component (B) and the catalyst (D). It can be seen that the content of the chain extender is calculated as an additional amount while taking the total amount of the prepolymer as 100 wt %.

The Waterborne Polyurethane Dispersion

According to an embodiment of the present application, the waterborne polyurethane dispersion is prepared by a two-stage reaction. In the first stage, a prepolymer is prepared by reacting the isocyanate groups in the isocyanate component (A) with the isocyanate-reactive groups in the isocyanate-reactive component (B) in the presence of the catalyst (D). A polyurethane backbone chain can be formed in the prepolymer by the above stated reaction. In the second stage, the prepolymer is mixed with the surfactant (E) and reacts with the chain extender (F) and the hydrophilic amino siloxane compound (C). The chain extender (F) and the hydrophilic amino siloxane compound (C) comprise isocyanate-reactive groups, e.g. amine group, which react with the free isocyanate groups remained in the prepolymer, hence their structural moieties are also introduced into the resultant polyurethane backbone chain. During the second stage, the chain of the prepolymer is further extended by the chain extender (F) and the hydrophilic amino siloxane compound (C) so as to form the waterborne polyurethane dispersion comprising polyurethane particles dispersed in water. The waterborne polyurethane dispersion may be heated and dried to form a skin film exhibiting superior improved performance properties such as enhanced color fastness, improved low temperature stability, good anti-stickiness, bally flex resistance, anti-abrasion and mechanical properties.

The waterborne polyurethane dispersion may have any suitable solids loading of polyurethane particles, but the solids loading is generally between about 1% to about 70% solids by weight of the total dispersion weight, preferably at least about 2%, more preferably at least about 4%, more preferably at least about 6%, more preferably at least about 15%, more preferably at least about 25%, more preferably at least about 35%, most preferably at least about 40%, to at most about 70%, preferably at most 68%, more preferably at most about 65%, more preferably at most about 60% and most preferably at most about 50% by weight.

The waterborne polyurethane dispersion may also contain a rheological modifier such as thickeners that enhance the dispersability and stability of the dispersion. Any suitable rheological modifier may be used such as those known in the art. Preferably, the rheological modifier is one that does not cause the dispersion to become unstable. More preferably, the rheological modifier is a water soluble thickener that is not ionized. Examples of useful rheological modifiers include methyl cellulose ethers, alkali swellable thickeners (e.g., sodium or ammonium neutralized acrylic acid polymers), hydrophobically modified alkali swellable thickeners (e.g., hydrophobically modified acrylic acid copolymers) and associative thickeners (e.g., hydrophobically modified ethylene-oxide-based urethane block copolymers). Preferably the rheological modifier is a methylcellulose ether. The amount of thickener is from at least about 0.2% to about 5% by weight of the total weight of the waterborne polyurethane dispersion, preferably from about 0.5% to about 2% by weight.

Generally, the waterborne polyurethane dispersion has a viscosity from at least about 10 cp to at most about 10,000 cp, preferably, from at least about 20 cp to at most about 5000 cp, more preferably, from at least about 30 cp to at most about 3000 cp.

In an embodiment of the present disclosure, the dispersion of the PU particles in the waterborne polyurethane dispersion can be promoted by the surfactant and high shear stirring action, wherein the shear force and stirring speed can be properly adjusted based on specific requirement.

According to one embodiment of the present disclosure, the waterborne polyurethane dispersion may further comprise one or more pigment, dyes and/or colorant, all of which are generally termed as "color masterbatch" in the present disclosure. For example, the color masterbatch may be added so as to impart a transparent or translucent film with a desired color. Examples of pigments dyes and/or colorants may include iron oxides, titanium oxide, carbon black and mixtures thereof. The amount of the pigment, dyes and/or colorant may be 0.1% to 15%, preferably 0.5-10%, more preferably 1% to 5% by weight, based on the total weight of the waterborne polyurethane dispersion. Suitable commercially available black pigments useful in the present invention may include for example EUDERM™ black B—N carbon black dispersion available from Lanxess Deutschland GmbH.

According to one embodiment of the present disclosure, the waterborne polyurethane dispersion may further comprise additional additives selected from the group consisting of thickening agent (such as acrylic), fast-drying agent (such as propylene glycol), defoamer (such as organic silicone), and any combinations thereof.

Without being limited by any theory, it is believed that the introduction of a certain crosslinking degree with the tri-functionality polyether polyol during the synthesis of prepolymer, as well as the introduction of the rigid aliphatic chain extender and the hydrophilic amino silicone oil represented by Formula I co-chain extender during the preparation of the PUD can significantly improve the performance properties (such as enhanced color fastness, improved low temperature stability, good anti-stickiness, bally flex resistance, anti-abrasion and mechanical properties) of the resultant polyurethane skin layer.

The Laminated Synthetic Leather Article

FIG. 1 is a schematic illustration of a cross-section of one embodiment of the synthetic leather article described herein. In one embodiment of the present disclosure, the synthetic leather article comprises, from top to bottom, a top skin film formed by the waterborne polyurethane dispersion, a 2K PU foam base layer, and a backing substrate (e.g. a textile fabric cloth). Please note that the leather article is not necessarily shown in actual proportion, and the dimensions of one or more layers may be exaggerated so as to clearly show the configuration thereof.

The 2K PU foam used in the present disclosure is preferably a non-solvent PU foam and comprises a continuous PU matrix that defines a plurality of pores and/or cells therein. As disclosed herein, the terms "solvent free", "solventless" or "non-solvent", can be used interchangeably for describing the PU foam or any other dispersion, mixture, etc., and shall be interpreted that the mixture of all the raw materials used for preparing the PU foam or PU dispersion comprise less than 3% by weight, preferably less than 2% by weight, preferably less than 1% by weight, more preferably less than 0.5% by weight, more preferably less than 0.2% by weight, more preferably less than 0.1% by weight, more preferably less than 100 ppm by weight, more preferably less than 50 ppm by weight, more preferably less than 10 ppm by weight, more preferably less than 1 ppm by weight of any organic or inorganic solvents, based on the total weight of the mixture of raw materials. As disclosed herein, the term "solvent" refers to organic and inorganic liquids whose function is solely dissolving one or more solid, liquid or gaseous materials without incurring any chemical reaction. In other words, although some organic compounds, e.g. ethylene glycol and propylene glycol, and water, which are generally considered as "solvent" in the polymerization technology, are used in the preparation of the 2K PU foam, none of them belongs to "solvent" since they mainly function as isocyanate-reactive functional substance, chain extending agent or foaming agent, etc. by incurring chemical reactions.

According to one embodiment of the present disclosure, the 2K PU foam layer has a thickness in the range from 0.01 µm to 2,000 µm, preferably in the range from 0.05 µm to 1,000 µm, more preferably in the range from 0.1 µm to 750 µm and more preferably in the range from 0.2 µm to 600 µm.

According to one embodiment of the present disclosure, the foamed polyurethane in the 2K polyurethane foam layer is prepared with a solvent-free polyurethane system comprising (i) one or more second isocyanate components, (ii) one or more second isocyanate-reactive components, (iii) one or more foaming agent, second catalyst and any other additives. The second isocyanate component (i) includes one or more polyisocyanates and/or isocyanate prepolymers which are used for the isocyanate component (A). The second isocyanate-reactive components (ii) comprise compounds having two or more isocyanate-reactive groups selected from OH groups, SH groups, NH groups, $NH_2$ groups and carbon-acid groups, for example β-diketo groups. According to one embodiment of the present application, the isocyanate-reactive components (ii) comprise those used for (B). In one preferred embodiment of the present disclosure, the second isocyanate components (i) and second the isocyanate-reactive components (ii) react with each other in the presence of a foaming/blowing agent, and the foaming agent is used in combination with the isocyanate-reactive components. Useful foaming agents include commonly known chemically or physically reactive compounds. Physical blowing agents may be selected from one or more of a group consisting of carbon dioxide, nitrogen, noble gases, (cyclo)aliphatic hydrocarbons having from 4 to 8 carbon atoms, dialkyl ethers, esters, ketones, acetal and fluoroalkanes having from 1 to 8 carbon atoms. The chemically reactive blowing agent preferably comprises water, which is preferably contained as a constituent of the blend with the isocyanate-reactive components (ii). The amount of the foaming agent is in the range from 0.05 to 10%, preferably in the range from 0.1 to 5%, more preferably from 0.1 to 2%, and most preferably from 0.1 to 0.5% by weight, based on the overall weight of all the raw materials used for preparing the 2K PU foam layer. The 2K PU layer typically has a density of 0.3 to 1.1 kg/liter and preferably has a density of 0.4 to 0.9 kg/liter.

In an embodiment of the present disclosure, the second isocyanate components (i) reacts with the second isocyanate-reactive components (ii) in the presence of a catalyst selected from organotin compounds, such as tin diacetate, tin dioctoate, dibutyltin dilaurate, and/or strongly basic amines such as diazabicyclooctane, triethylamine, triethylenediamine or bis(N,N-dimethylaminoethyl) ether in an amount from 0.01% to 5% by weight, preferably from 0.05% to 4% by weight, more preferably from 0.05% to 3% by weight, based on the overall weight of all the raw materials used for preparing the 2K PU foam layer.

In an embodiment of the present disclosure, the categories and molar contents of the second isocyanate components (i) and the second isocyanate-reactive components (ii) are particularly selected so that the overall equivalence ratio of NCO groups to NCO-reactive hydrogen atoms (e.g. hydrogen atom in the hydroxyl group) is in the range from 0.9:1 to 1.8:1, preferably from 0.92:1 to 1.6:1, preferably in the range from 0.95:1 to 1.5:1, and more preferably in the range from 1:1 to 1.45:1, more preferably in the range from 1.05:1 to 1.4:1, and more preferably in the range from 1.10:1 to 1.35:1.

Release Layer

Suitable release layers are typically known in the prior art as "release paper". Examples of suitable release layers include foils of metal, plastic or paper. In one preferred embodiment of the present disclosure, the release layer is a paper layer optionally coated with a plastic membrane. Preferably, the paper layer disclosed herein is coated with a polyolefin, more preferably polypropylene. Alternatively, the paper layer is preferably coated with silicone. In an alternative embodiment, the release layer used herein is a PET layer optionally coated with plastic membrane. Preferably, the PET layer can be is coated with a polyolefin, more preferably polypropylene. Alternatively, the PET layer is preferably coated with silicone. Examples of suitable release layers are commercially available. The release layers used in the present disclosure may have a flat, embossed or patterned surface so that corresponding or complementary surface profile can be formed on the outermost surface of the synthetic leather article. Preferably, the release layer is textured in the mode of leather grain so as to impart the synthetic leather article with good haptic property comparable with that of high grade natural leather. The release layer generally has a thickness of 0.001 mm to 10 mm, preferably from 0.01 mm to 5 mm, and more preferably from 0.1 mm to 2 mm.

The material and the thickness of the release layer can be properly adjusted, as long as the release layer is able to endure the chemical reaction, mechanical processing and thermal treatments experienced during the manufacturing procedures and can be readily peeled from the resultant synthetic leather without bringing about the delamination between the skin film and the 2K PU foam base layer.

Auxiliary Agents and Additives

The PU skin film and the 2K PU foam base layer may independently and optionally comprise any additional auxiliary agents and/or additives for specific purposes.

In one embodiment of the present disclosure, one or more of the auxiliary agents and/or additives may be selected from the group consisting of fillers, cell regulators, release agents, colorants/pigments, surface-active compounds, handfeeling agents, dullers, thickeners, crosslinkers and stabilizers.

Examples of suitable fillers comprise glass fibers, mineral fibers, natural fibers, such as flax, jute or sisal for example, glass flakes, silicates such as mica or glimmer, salts, such as calcium carbonate, chalk or gypsum. The fillers are typically used in an amount from 0.5% to 60% by weight, preferably from 3% to 30% by weight, and more preferably from 3% to 10% by weight, based on the overall dry weight of the skin film or the 2K PU foam base layer.

Backing Substrate

In an embodiment of the present disclosure, the backing substrate has a thickness of in the range from 0.01 mm to 50 mm, preferably in the range from 0.05 mm to 10 mm and more particularly in the range from 0.1 mm to 5 mm. The backing substrate may comprise one or more selected from the group consisting of fabric, preferably woven or nonwoven fabric, impregnated fabrics, knit fabric, braid fabric or microfiber; foil of metal or plastic, e.g. rubber, PVC or polyamides; and leather, preferably split leather.

The backing substrate can be made of a woven or non-woven textile. Preferably, the textile is a nonwoven textile. The textile may be made by any suitable method such as those known in the art. The textile may be prepared from any suitable fibrous material. Suitable fibrous materials include, but are not limited to, synthetic fibrous materials and natural or semi synthetic fibrous materials and mixtures or blends thereof. Examples of synthetic fibrous materials include polyesters, polyamides, acrylics, polyolefins, polyvinyl chlorides, polyvinylidene chlorides, polyvinyl alcohols and blends or mixtures thereof. Examples of natural semi-synthetic fibrous materials include cotton, wool and hemp.

Manufacture Technology

The waterborne polyurethane dispersion may be applied by conventional coating technologies such as spraying coating, blade coating, die coating, cast coating, etc.

The skin film can be either partially or completely dried before the application of the next layer. Preferably, the skin film is completely dried so as to minimize the moisture entrapped therein, and then the next layer is applied thereon. In an alternative embodiment of the present application, only part of the moisture is removed from the skin film on the release layer, then the skin film is completely dried together with the 2K PU foam layer applied thereon.

According to one embodiment, the second isocyanate component (i) and the second isocyanate-reactive component (ii) for the 2K non-solvent PU foam are mixed together, applied to the skin film, and pre-cured by being heated in an oven at a temperature of e.g. from 70° C. to 120° C., preferably from 75° C. to 110° C. for a short duration of 10 seconds to 5 minutes, preferably from 30 seconds to 2 minutes, more preferably from 45 to 90 seconds. Then the backing substrate (e.g. a textile fabric) is applied to the pre-cured 2K PU foam layer with the assistance of a pressing roller, followed by being post cured at a higher temperature of e.g. from 100° C. to 160° C., preferably from 110° C. to 150° C. for a longer duration of 3 to 20 minutes, preferably from 3 to 15 minutes, more preferably from 4 to 10 minutes. The above stated two-step curing process aims to ensure high adhesion strength between the pre-cured 2K PU foam and the backing substrate.

According to a preferable embodiment of the present disclosure, the release layer is removed after the 2K PU foam has been fully cured. The release layer can be peeled off via any ordinary technologies.

According to a preferable embodiment of the present disclosure, after the removal of the release layer, a top finishing layer can be applied onto the surface of the synthetic leather (i.e. on the outermost surface of the skin film) and dried to form a protection film layer. The presence of the finishing layer can further increase abrasion resistance of the multilayer synthetic leather. The protection film layer may be formed by using any suitable raw materials and technologies. The finishing layer may optionally comprise additives such as wetting agent, crosslinking agent, binder, matting agent, hand-feel modifier, pigments and/or colorants, thickener or other additives used for the skin film. The synthetic leather disclosed herein can further comprise one or more than one optional additional layer such as a color layer between the skin film and the finishing layer. Other suitable optional additional layers can be selected from a water repellent layer, UV protective layer and tactile (touch/feel) modification layer. The process of the present invention may be carried out continuously or batchwise.

The multilayer structure synthetic leather disclosed herein can be cut or otherwise shaped so as to have a shape suitable for any desired purpose, such as shoe manufacturing. Depending on the intended application, the synthetic leathers can be further treated or post-treated similarly to natural leathers, for example by brushing, filling, milling or ironing. If desired, the synthetic leathers may (like natural leather) be finished with the customary finishing compositions. This provides further possibilities for controlling their character. The multilayer structure disclosed herein may be used in various applications particularly suitable for use as synthetic leather, for example, footwear, handbags, belts, purses, garments, furniture upholstery, automotive upholstery, and gloves. The multilayer structure is particular suitable for use in automotive applications.

EXAMPLES

Some embodiments of the invention will now be described in the following Examples, wherein all parts and percentages are calculated by weight unless otherwise specified.

The information of the raw materials used in the examples is listed in the following table 1:

TABLE 1

| Raw materials used in the examples | | |
|---|---|---|
| Raw Material | Description | Supplier |
| Isophorone diisocyanate (IPDI) | Aliphatic isocyanate, functionality = 2 | Evonik |
| Voranol 222-056 polyol | Ether polyol, Mw = 2000, EO capped, EO content = 12 wt. %, Hydroxyl Functionality = 2 | Dow Chemical |
| Voranol 4000LM polyol | Ether polyol, Mw = 4000, Hydroxyl Functionality = 2 | Dow Chemical |

TABLE 1-continued

Raw materials used in the examples

| Raw Material | Description | Supplier |
| --- | --- | --- |
| Voranol 3010 polyol | Ether polyol, Mw = 3000, EO capped, EO content = 6.6 wt. %, Hydroxyl Functionality = 3 | Dow Chemical |
| Voranol 4240 polyol | Ether polyol, Mw = 4000, EO capped, EO content = 16.9 wt. %, Hydroxyl Functionality = 2 | Dow Chemical |
| Castor oil | Polyol, with a OH value of 163 mg KOH/g, Hydroxyl Functionality = 2.7 | — |
| MPEG1000 | Ether polyol, Mw = 1000, Hydroxyl Functionality = 1 | Sinopharm |
| Piperazine | chain extender, functionality = 2 | Sinopharm |
| Sodium dodecyl benzene sulfonate (SDBS) | Surfactant | Sinopharm |
| Deionized water | Medium | N.A. |
| OFX-7700 | a hydrophilic amino siloxane compound of the present application having an amino value of 0.27 mmol/g | Dow Chemical |
| Black B-N | Black color master batch | Lanxess |
| RM 998 | Thickener | Dow Chemical |
| S2229 | Silicone based slipping agent | Dow Chemical |
| Acrysol RM 825 | Thickener | Dow Chemical |
| 1,2-Propanediol (PG) | Fast drying agent | Sinopharm |
| A2 additive | A mixture of silicone and fluorine based slipping agent | Dow/DuPont |
| DC-8590 | Silicone based defoamer | Dow Chemical |
| DABCO MB20 | Catalyst (organic bismuth) | Evonik |
| Bi Cat 8840 | Catalyst (organic bismuth) | Shepherd |
| Polycat SA2LE | Catalyst (tertiary amine) | Evonik |
| Polycat SA-8 | Catalyst (tertiary amine) | Evonik |
| Fomrez UL-29 | Catalyst (organic tin) | Momentive |
| SPECFLEX NR 1156 FORMULATED POLYOL | Formulated polyol with an OH value of ~64 mg KOH/g | Dow Chemical |
| SPECFLEX NE 1156 ISOCYANATE | Isocyanate prepolymer with NCO = 12.5% | Dow Chemical |

The 2K non-solvent PU foam was prepared by using the raw materials listed in table 2.

TABLE 2

Raw materials used in 2K PU composite

| Materials | Dosage (phr) |
| --- | --- |
| SPECFLEX NR 1156 FORMULATED POLYOL | 100 |
| SPECFLEX NE 1156 ISOCYANATE | 58 |
| Polycat SA2LE | 0.05 |
| Polycat SA-8 | 0.2 |
| Fomrez UL-29 | 0.03 |

In the following Inventive and Comparative Examples, synthetic leather articles comprising a skin film derived from the waterborne polyurethane dispersion and a 2K PU foam base layer were prepared by the following Steps 1) to 4).

1) Preparation of Prepolymers for the Waterborne Polyurethane Dispersion

Voranol 222-056, Voranol 4000LM polyol, Voranol 3010 polyol and MPEG1000 were charged into a 1000 ml three neck flask and dehydrated at 115° C. under 76 mmHg pressure for one hour, then naturally cooled down to a temperature of about 72° C. IPDI was poured into the dehydrated polyol mixture at about 72° C. under the protection of nitrogen (N₂) flow and mechanical stirring, then the catalyst DABCO MB20 was added into the flask. The reaction lasted for one hour at about 72° C., and then was heated to a temperature of about 82° C. and continued for additional 2.5 hours. The product was packaged in a plastic bottle and stored hermetically under nitrogen protection. The contents of all the components used in each comparative examples and inventive examples are summarized in Table 4. It can be seen that the total amount of the polyol components are kept at a constant level, hence it can be calculated that the theoretical NCO % of the resultant prepolymer is 7.5 wt %.

2) Preparation of the Waterborne Polyurethane Dispersion 100 gram of the prepolymer prepared in the above step 1) was poured into a 500 ml plastic cup and stirred with a cowles mixer. 13 g of a 23 wt % SDBS aqueous solution was gradually added into the prepolymer under a mixing speed of ~4000 rpm. After stirring for additional several minutes, ice water was dropwisely added into the prepolymer under a mixing speed of ~4000 rpm. Phase reversion happened upon the addition of ice water and an oil-in-water emulsion was formed. The mixing speed was then lowered down to ~1500 rpm. Aqueous solutions of the amino siloxane compound (the hydrophilic OFX-7700) and the piperazine, which have been degassed overnight, was dropwisely added into the emulsion. Once all the solution was added, mechanical stirring was continued for additional 12 minutes. Finally, a polyurethane dispersion with ~50% solid content was obtained and stored in a plastic container with cover.

3) Preparation of the PUD Skin Film 22.5 gram of the polyurethane dispersion prepared in 2) was weighed and diluted with equal amount of deionized water. The diluted PUD was transferred into a vacuum oven and degassed for ~10 minutes. Then the degassed PUD was poured into a plastic surface petri dish. The dish filled with PUD was transferred into an oven and heated at 48° C. for 24 hours, after which the film was peeled from the dish, reversed and continuously dried for another 24 hours. The film was cooled down to room temperature for tensile and tear testing.

4) Fabrication of the Synthetic Leather Article

The waterborne polyurethane dispersion prepared in 2) was mixed with color masterbatch, thickener, slipping agent and fast-drying agent as shown in table 3 at high speed (1000~3000 rpm) for several minutes. The formulated PUD was coated on a release paper to a wet film thickness of 100 μm. The coated release paper was dried in oven at 95° C. for 2 min, recoated with the formulated PUD to another wet film thickness of 100 μm, dried in oven at 95° C. for 2 min, and then at 110° C. for 2 min. The release paper with dried PU skin layer was taken out of the oven and cooled down to ambient temperature. The formulated 2K PU composite was coated on the dried PU skin film on the release paper to a wet film thickness of 300 μm. The release paper with the PU skin film and the coated 2K PU composite was transferred into a 100° C. oven and precured for 75 seconds. A backing substrate (textile fabric cloth) was then carefully applied onto the 2K PU foam layer and pressed with a 3.5 kg roller for 2 times. The specimen was put into a 140° C. oven and post-cured for 4 minutes, and then taken out and cooled down.

TABLE 3

The raw materials used in Step 4)

| Material | Dosage (phr) |
| --- | --- |
| PUD | 50.2 |
| Black B-N | 3 |
| RM 998 | 0.2 |
| S2229 | 2.5 |
| DC-8590 | 0.05 |
| Bi Cat 8840 | 0.10 |

Technologies for Characterizing the Products (a) Mechanical Properties of the PUD Film Formed in Step 3)

The tensile strength, elongation at break, modulus at 100% elongation and tear strength of the PUD films obtained in Step 3) were characterized according to the standard ASTM D412-15a. Generally speaking, a tensile strength or larger than 10 MPa, an elongation of larger than 500%, and a modulus at 100% elongation of larger than 2.5 MPa are desirable for the synthetic leather applications (especially synthetic leather for sofa and shoe).

(b) Anti-Stickiness Performance Property of the Synthetic Leather Article Prepared in Step 4)

The anti-stickiness of the synthetic leather articles prepared in above Step 4) was characterized according to the standard GB/T 8948-2008. In particular, two 90 mm×60 mm samples of the synthetic leather article were pasted together face to face under a pressure of 1 kg and heated in an oven at 85° C. for 3 h. The anti-stickiness was ranked from 1 to 5 according to the degree of stickiness between the two samples during detaching at room temperature:
Rank 1: not sticky at all;
Rank 2: can be detached with a little force;
Rank 3: can be detached with a certain force, and the surface is not destroyed;
Rank 4: can be detached with a large force and incomplete damage occurs on the surface; and
Rank 5: cannot be detached.

(c) Wet Color Fastness of the Synthetic Leather Article Prepared in Step 4)

The wet color fastness of the synthetic leather article prepared in Step 4) was measured according to the standard: ISO-11640. Particularly speaking, a soaked wet white wool felt (15 mm×15 mm) was loaded at the end of the friction head of the measuring instrument. The wool felt rubbed back and forth (with a friction distance of 37 mm) on the leather sample (120 mm×40 mm) with a load of 1 kg. The wet color fastness was evaluated based on whether the color of the white wool felt changed after 50 cycles of friction.
Pass: The color did not change after 50 cycles of friction.
Not Pass: The color changed after 50 cycles of friction.

(d) Low Temperature Stability of the PUD Prepared in Step 2)

The low temperature stability of the PUD prepared in step 2) was tested according to customer's requirement. In particular, the PUD was stored in a fridge under 4° C. for 2 weeks, after which the PUD was allowed to thaw at room temperature (20° C.). The low temperature stability was evaluated according to the final state of the PUD.
Pass: The PUD recovered to a liquid with a final viscosity less than 1000 cps.
Not pass: The PUD could not recover to a liquid or recovered to a liquid with a final viscosity higher than 1000 cps.

(e) Bally Flex Resistance of the Synthetic Leather Article Prepared in Step 4)

The bally flex resistance of the synthetic leather article prepared in Step 4) was characterized according to the standard: QB-T 2714-2005. In particular, a leather flexing tester was used to measure the bally flex resistance of specimen (70 mm×45 mm) cut from the synthetic leather prepared in step 4). The bottom end of the specimen was fixed, and the upper end was folded and then unfolded. The specimen was checked for any damage after certain times of the above stated folding/unfolding cycle.
Pass: The specimen was not damaged after both 50000 folding/unfolding cycles at room temperature (20° C.) and 30000 folding/unfolding cycles at −15° C.
Not pass: The specimen was damaged after 50000 folding/unfolding cycles at room temperature (20° C.) or 30000 folding/unfolding cycles at −15° C.

The formulations and characterization results of the Comparative Examples 1-3 and the Inventive Examples 1-2 were summarized in Table 4. The difference between the inventive examples and the comparative examples is that the comparative examples either comprise no tri-functional polyether polyol (Voranol 3010 polyol) for the synthesis of prepolymer, or comprises a content lower or higher than the preferable tri-functionality polyether polyol content. Particularly speaking, Comparative Example 1 only comprises di-functional polyether polyol (Voranol 222-056 polyol and Voranol 4000LM polyol), while Comparative Example 2 and 3 comprises 5 wt % or 30 wt % of the tri-functional polyether polyol (Voranol 3010 polyol) which is beyond the preferable scope of 10-20 wt % as defined in the present application. On the other hand, the Inventive Example 1 and 2 comprise 10 wt % and 20 wt % tri-functional polyether polyol (Voranol 3010 polyol), respectively. In these Comparative Examples and Inventive Examples, the relative amounts of the di-functional polyether polyols (Voranol 222-056 and Voranol 4000LM) were slightly adjusted so as to keep the EO % in the target prepolymers at an approximately constant level (5-6%). The PUD dispersion formulations for these examples, including the dosage of surfactant, water and the chain extender package, are all the same. Rigid aliphatic diamine piperazine was used as main chain extender to increase the mechanical properties of the PUD film, including the tensile strength and the modulus at 100% elongation. Hydrophilic amino silicone oil OFX-7700 was used as co-chain extender in order to improve the anti-stickiness of the final synthetic leather.

The comparison between Comparative Examples 1-3 and Inventive Examples 1-2 illustrates the technical effect derived from the incorporation of the tri-functional polyether polyol (Voranol 3010 polyol) as well as the particularly designed content thereof. All the samples exhibit an anti-stickiness rank of 1, which represents an excellent anti-stickiness performance and can meet the requirement of the synthetic leather manufacturer and customer. Nevertheless, none of the comparative examples can simultaneously meet all the requirements on mechanical properties (tensile strength, elongation, modulus at 100% elongation), low temperature stability, anti-stickiness, bally flex resistance and color fastness.

TABLE 4

The formulations and characterization results of the Comparative Examples 1-3 and the Inventive Examples 1-2

|  | Comparative Example 1 | Comparative Example 2 | Comparative Example 3 | Inventive Example 1 | Inventive Example 2 |
|---|---|---|---|---|---|
| Prepolymer Synthesis |  |  |  |  |  |
| Voranol 222-056 polyol | 30 | 25 | 10 | 20 | 20 |
| Voranol 4000LM polyol | 42 | 42 | 32 | 42 | 32 |
| Voranol 3010 polyol | 0 | 5 | 30 | 10 | 20 |
| MPEG1000 | 2 | 2 | 2 | 2 | 2 |
| DABCO MB20 | 0.1 | 0.1 | 0.1 | 0.1 | 0.1 |
| IPDI | 26 | 26 | 26 | 26 | 26 |
| PUD Preparation |  |  |  |  |  |
| Prepolymer |  |  | 100 |  |  |
| SDBS (23% aqueous) |  |  | 13 |  |  |
| Ice/water (50/50) |  |  | 33.1 |  |  |
| OFX-7700 (20% aqueous) |  |  | 12.5 |  |  |
| Piperazine (10% aqueous) |  |  | 65.5 |  |  |
| Solid content |  |  | 50% |  |  |
| PUD Properties |  |  |  |  |  |
| Tensile strength (MPa) | 27.6 | 23.5 | 11.5 | 21.3 | 17.1 |
| Elongation (%) | 807 | 772 | 417 | 759 | 620 |
| Modulus at 100% Elongation (MPa) | 4.1 | 4.3 | 4.8 | 4.7 | 4.0 |
| Low temperature stability | Not pass | Not pass | Pass | Pass | Pass |
| Synthetic leather skin layer |  |  | see Table 3 |  |  |
| Anti-stickiness rank | 1 | 1 | 1 | 1 | 1 |
| Wet color fastness | Not pass | Not pass | Pass | Pass | Pass |
| Bally flex resistance | Pass | Pass | Not pass | Pass | Pass |

The comparison between inventive examples 1 & 2 and comparative examples 1 & 2 shows that the prepolymer prepared by using 10-20 wt % of the tri-functional polyether polyol can achieve significant improvement in the low temperature stability of PUD and wet color fastness of the synthetic leather skin layer over the comparative prepolymer prepared by using no tri-functional polyether polyol or lower amount of tri-functional polyether polyol. Meanwhile, the inventive examples 1 & 2 still exhibit good mechanical properties (tensile strength and elongation) and bally flex resistance.

The comparison between inventive examples 1 & 2 and comparative example 3 shows that the prepolymer prepared by using 10-20 wt % of the tri-functional polyether polyol can achieve significant improvement in the bally flex resistance of the synthetic leather skin layer over the comparative prepolymer prepared by using higher amount of the tri-functional polyether polyol. Meanwhile, the inventive examples 1 & 2 exhibit much better mechanical properties (elongation) over the comparative example 3.

Comparative Examples 4-7

Comparative Examples 4 to 7 were performed by repeating the procedures of the Inventive Example 1, except that the formulations shown in the following Table 5 and Table 6 were adopted.

TABLE 5

The formulations and characterization results of the Comparative Examples 4-7

|  | Comparative Example 4 | Comparative Example 5 | Inventive Example 6 | Inventive Example 7 |
|---|---|---|---|---|
| Prepolymer Synthesis | | | | |
| Voranol 222-056 polyol | 63.5 | — | 63.5 | — |
| Voranol 4000LM polyol | — | 26 | — | 26 |
| Voranol 4240 polyol | — | 41.5 | — | 41.5 |
| Castor oil | 5.5 | 5.5 | 5.5 | 5.5 |
| Voranol 3010 polyol | 0 | 0 | 0 | 0 |
| MPEG1000 | 2 | 2 | 2 | 2 |
| DABCO T-12 | 0.03 | 0.03 | 0.03 | 0.03 |
| IPDI | 29 | 25 | 29 | 25 |
| PUD formulation | | | | |
| Prepolymer | 80 | 80 | 80 | 80 |
| SDBS (23% aqueous) | 10.4 | 10.4 | 10.4 | 10.4 |
| Ice/water (50/50) | 76 | 77.5 | 71 | 72.5 |
| OFX-7700 (20% aqueous) | 0 | 0 | 10 | 10 |
| Piperazine (10% aqueous) | 52.6 | 50.8 | 52.6 | 50.8 |
| Solid content | 40% | 40% | 40% | 40% |
| PUD film mechanical properties | | | | |
| Tensile strength (MPa) | 29.9 | 17.7 | 27.6 | 17.8 |
| Elongation (%) | 749 | 757 | 807 | 719 |
| Modulus at 100% Elongation (MPa) | 4.3 | 3.8 | 4.1 | 4.0 |
| Low temperature stability | Not pass | Not pass | Not Pass | Not Pass |
| Synthetic leather skin layer | | see Table 6 | | |
| Anti-stickiness rank | 3 | 3 | 1 | 1 |
| Wet color fastness | Not pass | Not pass | Not pass | Not pass |
| Bally flex resistance | Pass | Pass | Pass | Pass |

TABLE 6

The Synthetic leather skin layer formulation of Comparative Examples 4 to 7

| Material | Dosage (phr) |
|---|---|
| PUD | 93 |
| Black B-N | 5 |
| PG (1,2-Propanediol) | 5 |
| RM 825 | 2 |
| A2 additive | 0.5 |

It can be seen that all of these comparative examples, which do not comprise the tri-functional polyether polyol, exhibit inferior low temperature stability and wet color fastness.

What is claimed is:

1. A waterborne polyurethane dispersion comprising polyurethane particles dispersed in water, wherein the waterborne polyurethane dispersion is derived from the reaction of:

(A) an isocyanate component comprising one or more compounds having at least two isocyanate groups;

(B) an isocyanate-reactive component comprising one or more compounds having at least two isocyanate-reactive groups, wherein the isocyanate-reactive component comprises polyether polyols having a hydroxyl functionality of 3.0 and a weight average molecular weight of 1,500 to 12,000 g/mol;

(C) a hydrophilic amino siloxane compound represented by Formula I:

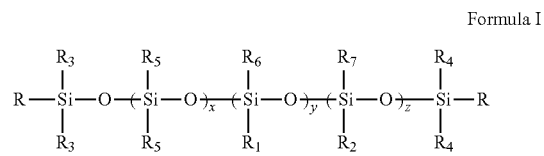

Formula I wherein each R independently represents methyl, ethyl, n-propyl, i-propyl, n-butyl, butyl, sec-butyl, t-butyl, n-pentyl, i-pentyl, tert-pentyl, neo-pentyl, cyclohexyl, phenyl, vinyl, allyl or —(OCH$_2$CH$_2$)$_a$—O—CH$_2$—CH=CH$_2$;

R$_1$ is —(CH$_2$)$_m$NH$_2$ or —(CH$_2$)$_s$—NH—(CH$_2$)$_t$NH$_2$;

R$_2$ is —CH$_2$CH$_2$CH$_2$O(CH$_2$CH$_2$O)$_n$H; and each of R$_3$, R$_4$, R$_5$, R$_6$ and R$_7$ is independently selected from the group consisting of methyl, ethyl, n-propyl, i-propyl, n-butyl, i-butyl, sec-butyl, t-butyl, n-pentyl, i-pentyl, tert-pentyl, neo-pentyl, cyclohexyl and phenyl;

wherein a is an integer of 1 to 10; x is an integer of 20-500; y is an integer of 1-10; z is an integer of 1-10; m is an integer of 1-5; s is an integer of 1, 2, 3, 4 or 5; t is an integer of 1, 2, 3, 4 or 5; and n is an integer of 5-20; and wherein the content of the hydrophilic amino siloxane compound (C) is from 2.0 wt % to 10 wt %, based on the total weight of the isocyanate component (A), the isocyanate-reactive component (B), and the catalyst (D);

(D) a catalyst;
(E) a surfactant;
(F) a chain extender; and
(G) water.

2. The waterborne polyurethane dispersion according to claim 1, wherein there is no cationic or anionic hydrophilic pendant groups covalently attached to the backbone chain of polyurethane in the polyurethane particles or groups which can be converted into the cationic or anionic hydrophilic pendant groups which groups are covalently attached to the backbone chain of polyurethane in the polyurethane particles, and the polyurethane is externally emulsified.

3. The waterborne polyurethane dispersion according to claim 1, wherein the one or more compounds having at least two isocyanate groups are selected from the group consisting of:
   a) C4-C12 aliphatic polyisocyanates comprising at least two isocyanate groups, C6-C15 cycloaliphatic or aromatic polyisocyanates comprising at least two isocyanate groups, C7-C15 araliphatic polyisocyanates comprising at least two isocyanate groups, and a combination thereof; and
   b) an isocyanate prepolymer prepared by reacting one or more polyisocyanates of a) with one or more isocyanate-reactive components selected from the group consisting of C2-C16 aliphatic polyhydric alcohols comprising at least two hydroxy groups, C6-C15 cycloaliphatic or aromatic polyhydric alcohols comprising at least two hydroxy groups, C7-C15 araliphatic polyhydric alcohols comprising at least two hydroxy groups, polyester polyols having a molecular weight from 500 to 5,000, polycarbonate diols having a molecular weight from 200 to 5,000, polyetherdiols having a molecular weight from 200 to 5,000, polyether polyols having a hydroxyl functionality of 3.0 and a weight average molecular weight of 1,500 to 12,000 g/mol, C2 to C10 polyamine comprising at least two amino groups, C2 to C10 polythiol comprising at least two thiol groups, C2-C10 alkanolamine comprising at least one hydroxyl group and at least one amino groups, and a combination thereof, with the proviso that the isocyanate prepolymer comprises at least two free isocyanate terminal groups.

4. The waterborne polyurethane dispersion according to claim 1, wherein the content of the isocyanate component (A) is from 5 wt % to 50 wt %, based on the total weight of the isocyanate component (A), the isocyanate-reactive component (B) and the catalyst (D).

5. The waterborne polyurethane dispersion according to claim 1, wherein the one or more compounds having at least two isocyanate-reactive groups are selected from the group consisting of: C2-C16 aliphatic polyhydric alcohols comprising at least two hydroxy groups, C6-C15 cycloaliphatic or aromatic polyhydric alcohols comprising at least two hydroxy groups, C7-C15 araliphatic polyhydric alcohols comprising at least two hydroxy groups, polyester polyols having a molecular weight from 500 to 5,000, polycarbonate diols having a molecular weight from 200 to 5,000, polyetherdiols having a molecular weight from 200 to 5,000, polyether polyols having a hydroxyl functionality of 3.0 and a weight average molecular weight of 1,500 to 12,000 g/mol, C2 to C10 polyamine comprising at least two amino groups, C2 to C10 polythiol comprising at least two thiol groups, C2-C10 alkanolamine comprising at least one hydroxyl group and at least one amino groups, vegetable oil having at least two hydroxyl groups, and a combination thereof.

6. The waterborne polyurethane dispersion according to claim 1, wherein the content of the isocyanate-reactive component (B) is from 35 wt % to 95 wt %, based on the total weight of the isocyanate component (A), the isocyanate-reactive component (B) and the catalyst (D).

7. The waterborne polyurethane dispersion according to claim 1, wherein the content of the polyether polyols having a hydroxyl functionality of 3.0 and a weight average molecular weight of 1,500 to 12,000 g/mol is from 10 wt % to 20 wt %, based on the total weight of the isocyanate component (A), the isocyanate-reactive component (B) and the catalyst (D).

8. The waterborne polyurethane dispersion according to claim 1, wherein the catalyst (D) is selected from the group consisting of: organotin compound, organic bismuth compound, tertiary amine, morpholine derivative, piperazine derivative, and combination thereof; and
   wherein the content of the catalyst (D) is 1.0 wt % or less, based on the total weight of the isocyanate component (A), the isocyanate-reactive component (B) and the catalyst (D).

9. The waterborne polyurethane dispersion according to claim 1, wherein the surfactant (E) is selected from the group consisting of: poly(oxy-1,2-ethanediyl) α-sulfo-ω (nonylphenoxy) salt, alkali metal oleates and stearates, alkali metal $C_{12}$-$C_{16}$ alkyl sulfates, amine $C_{12}$-$C_{16}$ alkyl sulfates, alkali metal $C_{12}$-$C_{16}$ alkyl benzene sulfonates, amine $C_{12}$-$C_{16}$ alkyl benzene sulfonates, fluorinated $C_4$-$C_{16}$ alkyl esters, alkali metal $C_4$-$C_{16}$ perfluoroalkyl sulfonates, and the combination thereof; and
   wherein the content of the surfactant (E) is 10 wt % or less, based on the total weight of the isocyanate component (A), the isocyanate-reactive component (B) and the catalyst (D).

10. The waterborne polyurethane dispersion according to claim 1, wherein the chain extender (F) is selected from the group consisting of: $C_2$-$C_{16}$ aliphatic polyamine comprising at least two amine groups, $C_4$-$C_{15}$ cycloaliphatic or aromatic polyamine comprising at least two amine groups, $C_7$-$C_{15}$ araliphatic polyamine comprising at least two amine groups; and
   wherein the content of the chain extender (F) is from 1.0 wt % to 15 wt %, based on the total weight of the isocyanate component (A), the isocyanate-reactive component (B) and the catalyst (D).

11. A method for preparing the waterborne polyurethane dispersion according to claim 1, the method comprising
   (i) reacting the isocyanate component (A) with the isocyanate-reactive component (B) in the presence of the catalyst (D) to form a prepolymer, wherein the isocyanate-reactive component (B) comprises polyether polyols having a hydroxyl functionality of 3.0 and a weight average molecular weight of 1,500 to 12,000 g/mol; and
   (ii) reacting the prepolymer with the hydrophilic amino siloxane compound (C) and the chain extender (F) in the presence of the surfactant (E) and water (G) to form the waterborne polyurethane dispersion.

12. A synthetic leather article, comprising, from top to bottom:
   a polyurethane skin film derived from the waterborne polyurethane dispersion according to claim 1;
   a base layer derived from a two-component PU composite composition; and
   an optional backing substrate, wherein the polyurethane skin film directly contacts with one side of the base layer, and the backing substrate, when present, directly contacts with the opposite side of the base layer.

13. A method for preparing the synthetic leather article according to claim 12, comprising:
   a) providing the waterborne polyurethane dispersion according to claim 1;
   b) forming the polyurethane skin film with the waterborne polyurethane dispersion;
   c) applying the two-component PU composite composition onto one side of the polyurethane skin film to form the base layer; and
   d) optionally applying the backing substrate onto one side of the base layer opposite the polyurethane skin film.

* * * * *